United States Patent Office 3,597,159
Patented Aug. 3, 1971

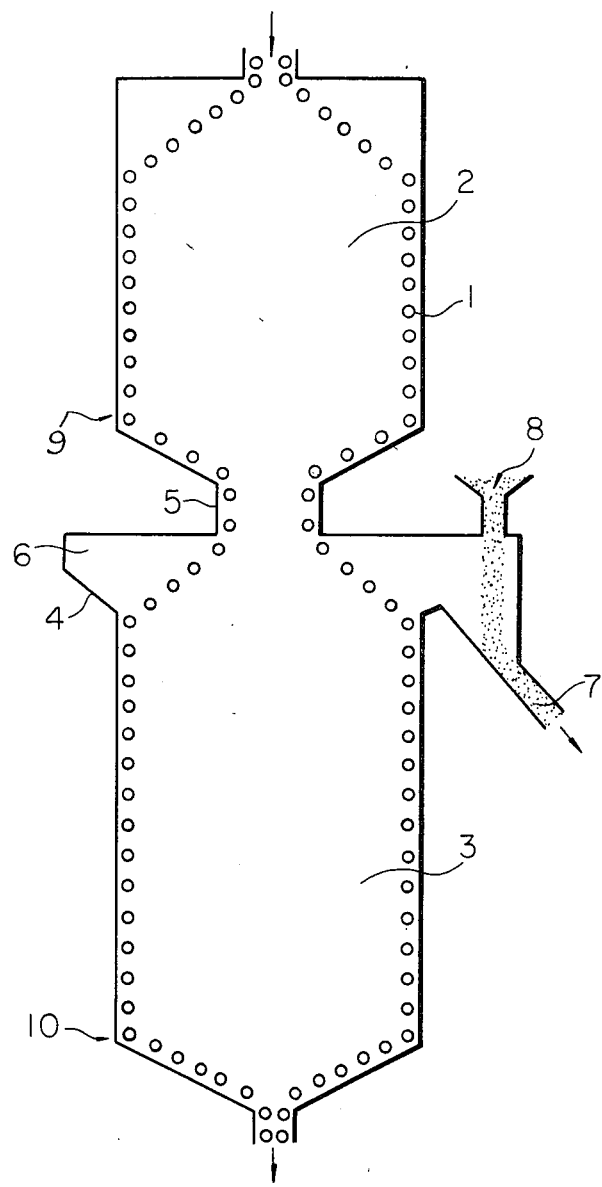

3,597,159
METHOD OF PREVENTING BLOCKING OF GAS OUTLETS
Keiichi Nakaya, Yasuo Osanai, and Shiro Fukui, Ichihara-shi, and Isami Takakura, Chiba-shi, Japan, assignors to Asahi Glass Co., Ltd., Tokyo, Japan
Filed Feb. 3, 1969, Ser. No. 796,106
Claims priority, application Japan, Feb. 12, 1968, 43/8,363
Int. Cl. C01b 7/02; C01g 49/10; B01d 53/02
U.S. Cl. 23—219      5 Claims

ABSTRACT OF THE DISCLOSURE

Iron chloride-containing reaction masses are oxidized with an oxygen-containing gas at high temperatures to liberate a chlorine-containing gas which is contacted and quenched with a moving cold granular material at a product gas outlet, whereby the gasified iron chloride in said gas is condensed onto said granular material and, simultaneously, the iron chloride deposit at the gas outlet is scraped away by the abrasion of said granular material.

BACKGROUND OF THE INVENTION

This invention relates to a method of preventing the blocking of a gas outlet which has heretofore been encountered in the process wherein reaction masses of iron oxides are chlorinated with hydrogen chloride or ammonium chloride and the resulting chlorinated reaction masses are oxidized at high temperature so as to liberate a chlorine-containing gas for withdrawal through said gas outlet. The blocking of the outlet is caused by the deposits formed on condensation of the gasified iron chloride in the vicinity of said outlet.

DESCRIPTION OF THE PRIOR ART

The process for the production of chlorine gas is known wherein hydrogen chloride or ammonium chloride is reacted with iron oxides and the resulting iron chloride is then reacted with an oxygen-containing gas such as air or oxygen to produce chlorine gas and, simultaneously, reclaim the iron oxides in the original form.

The process typically comprises the following steps. The reaction component is composed predominantly of iron oxides, to which potassium chloride is added in order to lower the vapor pressure of iron chloride that will be formed upon chlorination of the reaction component. Copper chloride is also added as a reaction promoter.

The reaction component is supported by an inert porous solid carrier, such as diatomaceous earth, and the resultant reaction masses, in moving beds, are contacted, in countercurrents, with hydrogen chloride gas or ammonium chloride gas at 350° to 500° C., whereby the reaction masses are chlorinated. The chlorinated reaction masses are contacted, in a similarly countercurrent manner, with an oxygen-containing gas such as oxygen or air at 400° to 650° C., whereupon chlorine gas is produced. (Refer to U.S. Pat. No. 3,332,742 to Metaizeau.)

It is also known that, at temperatures below the above lower limit, both the conversion of hydrogen chloride, to chlorine in the chlorination step and that of iron chloride to iron oxide are considerably lowered.

Iron chloride ($FeCl_3$) has a high vapor pressure, and though its vapor pressure can be lowered by the addition of an alkali metal chloride, such as potassium chloride, it is still impossible to effectively control the gasification of iron chloride so that the product contains a large amount of gasified iron chloride because, in the neighborhood of the gas outlet, the reaction masses contain a high concentration of iron chloride carried over from the chlorination step.

The gasified iron chloride and the iron chloride in the reaction masses are converted to iron oxides in the oxidation step. And a portion of the iron oxide is contained, in a finely divided state, in the product gas. To withdraw the product gas from the dechlorination chamber, a pipe is or pipes are usually inserted into the core of the dechlorination chamber so as to withdraw the gas from the core. This practice is based on the fact that the core temperature of the chamber is higher than the temperature near the wall. (In a typical commercial dechlorination chamber, the temperature difference between the core and wall is about 150° to 200° C.) In this known reaction, the product gas is larger in amount and more concentrated in chlorine at higher temperatures.

At high temperatures, more of the iron chloride is gasified so that the degree of gasification of iron chloride in the core of the dechlorination chamber is higher than in the vicinity of the wall. Therefore, when the gas is withdrawn in the foregoing manner, it will contain large amounts of gasified iron chloride and finely divided iron oxides. And as the gas travels through the discharge pipe to the outside of the chamber, its temperature drops by degrees, whereupon the gasified iron chloride is gradually condensed and, simultaneously, the finely divided iron oxides are conglomerated.

As a result, the discharge pipe is blocked with the deposits, thus preventing a smooth, continuous withdrawal of the product gas.

As a measure to prevent such blocking, there has been proposed a method to heat the discharge port or pipe, the temperature of which tends to drop, as explained above, so as to prevent condensation of the gasified iron chloride. However, this method involves the use of complicated equipment and procedure, and such equipment would not only be costly but also so vulnerable to corrosive factors that its useful life is necessarily limited.

SUMMARY OF THE INVENTION

It is an object of this invention to provide a method of preventing the blocking of the product gas outlet of a dechlorination chamber due to the condensation of gasified iron chloride in the vicinity of said outlet when the product gas is withdrawn from said chamber.

Other objects of this invention will be apparent from the following description of the invention, taken together with the accompanying drawing.

BRIEF DESCRIPTION OF THE DRAWING

The accompanying drawing shows a typical chlorine gas production plant in which clogging of the gas outlet has been prevented according to this invention.

DETAILED DESCRIPTION AND PREFERRED EMBODIMENTS OF THE INVENTION

In accordance with the present invention, gasified iron chloride is contacted with a moving granular material of lower temperature than that of the gas to effect a quenching of the gas so as to cause said gasified iron chloride to condense and deposit on said granular material.

It has been found that, as the iron chloride is thus carried away along with the granular material, the condensation and deposition of said gasified iron chloride at the chlorine gas outlet is substantially prevented.

It should be understood, however, that if the granular material were merely admixed with the reaction masses in a chlorine gas production plant, the chlorination and oxidation steps would be adversely affected. Thus, such incorporation of the granular material would not only make unfeasible a repeated cycle of chlorination and oxidation but also result in a loss of heat. To overcome those disadvantages, it is preferable that the granular material be contacted with the gasified iron chloride only at the gas outlet to effect a quenching of the latter and, after the iron chloride is thus trapped by the granular material, the latter so used be withdrawn from the dechlorination zone.

The granular material to be employed according to this invention may be the reaction mass itself or siliceous sand. The use of the very reaction mass offers the following advantages. Since the gasified iron chloride can be recovered along with the reaction mass and the latter may be recycled, as it is, to the chlorination-dechlorination process, the iron chloride is not lost from the reaction system. Where siliceous sand is used as said quenching granular material, the iron chloride condensed and deposited on the siliceous sand can be separated from the sand by washing with water and the sand is recycled for the condensation and deposition of gasified iron chloride.

In this instance, the iron chloride condensate on the siliceous sand is carried away from the reaction system, thus necessitating a periodical addition of the iron component to the reaction mass to be recycled to the chlorination-dechlorination system.

In preventing the blocking of the gas outlet according to this invention, the effect can be significantly improved by reducing the amount of gasified iron chloride at the outlet to a minimum. Thus, in withdrawing the product gas from the dechlorination chamber, this invention does not use the conventional method wherein a withdrawing pipe is inserted into the chamber core, the temperature of which is the highest, to withdraw the portion of product gas which contains the highest concentration of iron chloride. Thus, taking advantage of the temperature and concentration gradient across the cross-section of the dechlorination chamber where the gas temperature is lowest in the vicinity of the side wall and where the concentration of gasified iron chloride is also lowest, the product gas outlet is provided at said wall to withdraw the product gas.

Actually, when the temperature in the core of the dechlorination chamber is 540° C., the temperature near the side wall is about 350° C., which is lower than the core temperature by about 200° C. (Those values are approximately the standard values for commercial dechlorination chambers.)

In industrial production, while about 5000 to 6000 mg./m.$^3$ of gasified iron chloride usually occurs in the gas withdrawn from the core, the gasified iron chloride content near the wall is as low as about 300 mg./m.$^3$ or about one-twentieth of the amount in the core section. This is because the temperature of the gas drops as it moves from the core toward the wall and, as a result, the vapor pressure of gasified iron chloride also drops, with the result that the amount of the gasified iron chloride shows a substantial decrease.

The above situation facilitates a condensation and deposition of the gasified iron chloride at the gas outlet. The amount of the granular material to be employed according to this invention should vary with, the temperature of the gas and the amount of gasified iron chloride. For example, in order that 1 Nm.$^3$ of gas which contains 5000 mg. of gasified iron chloride per Nm.$^3$ at 550° C. may be cooled to the temperature range of 300° C. to room temperature, it is necessary to employ 3 to 1 kg. of the granular material, the temperature of which is equal to 300° C. to room temperature.

A preferred embodiment of the method of the present invention will hereinafter be described with reference to the accompanying drawing. Iron oxide is supported by an inert porous solid carrier, such as diatomaceous earth, within a suitable grain size range to form a reaction mass 1. A chlorination chamber 2 is superimposed on a dechlorination chamber (oxidation chamber) 3, and the reaction masses 1 are fed through the top of the chlorination chamber 2. While the reaction mass travels by gravity, in moving beds, through the plant, it is chlorinated in the chlorination chamber 2 by hydrogen chloride or ammonium chloride at 350° C. to 500° C., whereupon the iron oxide in the reaction mass is converted to iron chloride. The reaction mass thus containing the iron chloride then enters the dechlorination chamber 3 where it is contacted, in countercurrents, with oxygen or air at 450° C. to 650° C., said oxygen or air being admitted into the chamber 3 at 10. Upon the above contact between the reaction mass and oxygen or air, the iron chloride is oxidized to liberate chlorine gas, which is then withdrawn from the top 4 of the dechlorination chamber 3.

The top 4 of the declorination chamber 3 is comparatively large in diameter, while the connecting passage 5 between the chlorination and dechlorination chambers is somewhat constricted. In this construction, when the reaction masses flowing by gravity from the chlorination chamber 2 enter the dechlorination chamber 3, a free space 6 is formed by the angle of repose (the cone). A chlorine gas outlet 7 is provided in the wall of the chamber 3 adjacent space 6.

The disposition of the product gas outlet adjacent the free space 6 offers the following advantages. The reaction masses do not come in direct contact with the wall and, therefore, the gas outlet is protected against a possible clogging by the masses and the reaction masses are prevented from finding their way out of the chamber through the outlet. In addition, the reaction masses are protected against channeling which might be induced by a gas outlet otherwise located.

The greater portion of the gasified iron chloride is trapped by the moving reaction masses before it reaches the product gas outlet. The granular material, e.g. siliceous sand or the dechlorinated reaction mass, which is capable of trapping the iron chloride, is introduced through an inlet 8 in such a manner that said granular material flows down the discharge outlet 7. Flowing down the outlet 7 in this manner, the granular material comes into contact with the gasified iron chloride, whereby the latter is quenched. The iron chloride is thus forced to deposit on the granular material and is carried away with the latter. At the same time, the portion of iron chloride which has already been condensed and deposited at the outlet is physically scraped off by the flowing granular material. In this manner, the possible blocking of the gas outlet is substantially prevented.

The temperature of the granular material to be employed according to this invention should be below 400° C. and preferably below 350° C.

However, the best result can generally be attained by using the granular material at room temperature without prior temperature adjustments.

While the grain size of the granular material to be employed according to this invention varies somewhat with the size and shape of the product gas outlet, the amount of withdrawal (flow rate) of the product gas and other factors, the generally preferred size ranges from 100μ to 8000μ, approximately.

Irrespective of the type of granular material, it can be so arranged, as illustrated in the accompanying drawing, that the granular material flows, by gravity, down the gas outlet. Alternatively, it is also possible to employ such carrier means as compressed air streams.

Although the foregoing description has been confined to an embodiment wherein both chlorination and dechlorination (oxidation) reactions are carried out in moving beds, such other modes of reactions as those in fluidized beds can also be utilized with equal success.

It should also be understood that the process for chlorine gas production to which the method of this invention is applicable is not limited to the above-mentioned two-step process, i.e. the chlorination-dechlorination (oxidation) process.

For example, the method of the invention can be successfully applied to the three-step process (reduction-chlorination-oxidation) which comprises the steps of reducing the iron in the reaction masses to the divalent or monovalent state in order to enhance the rate of hydrogen chloride conversion, then chlorinating the reaction masses and finally oxidizing the same; and the four-step process (reduction-chlorination-pre-oxidation-oxidation) wherein, particularly in case air is used in the oxidation step, this step is divided into two sub-steps, in the first of which the divalent and monovalent irons are oxidized to the trivalent state without liberating chlorine gas and the air used for this purpose is removed from the reaction system and in the second of which the reaction masses are contacted with a fresh supply of air so as to produce a highly concentrated chlorine gas in high yield.

The present invention will be further described in the following examples, which are not limitative but merely illustrative of the invention.

Example 1

As illustrated in the accompanying drawing, a cylindrical chlorination chamber 2, 0.45 m. in inside diameter and 1.5 m. in length, is superimposed on a cylindrical dechlorination chamber 3, which is the same as above in inside diameter and 3 m. in length.

The top portion 4 of the dechlorination chamber 3 is somewhat enlarged in order to keep the free space 6 when the reaction masses flow down by gravity from the chlorination chamber 2. In the free space in the top portion of the dechlorination chamber 3, a cylindrical gas outlet 7, 6 cm. in inside diameter, is formed in a downwardly inclined direction. Disposed over the gas outlet 7 through the wall of the dechlorination chamber is a condensing medium inlet 8 through which a granular material adapted to condense the iron chloride is introduced. To prepare the reaction masses 1, 0.1 kg. of iron oxide, 0.09 kg. of potassium chloride and 0.03 kg. of copper chloride are supported on 1 kg. of diatomaceous earth, which has a grain size of about 5 mm.

The reaction masses 1 are fed through the top of said chlorination chamber 2 and allowed to flow down by gravity, in moving beds.

In the meantime, the reaction masses are contacted, in a countercurrent manner, with ammonium chloride sublimated at 400° C. and admitted at 9, whereby the chlorination is effected.

The chlorinated reaction masses are further allowed to flow by gravity, in moving beds, through the dechlorination chamber at the rate of 300 kg. per hour. Dry air maintained at the temperature of 600° C. is admitted into the dechlorination chamber at 10 in countercurrents with the reaction masses, whereupon the latter are oxidized to liberate chlorine gas.

The temperatures within the dechlorination chamber range from the highest temperature of 540° C. at the core to the lowest temperature of 350° C. near the wall. In the core section, the amount of gasified iron chloride is 5000 mg./Nm.³, while the corresponding amount at the wall where the chlorine gas outlet 7 is located is 400 mg./Nm.³. The product gas is withdrawn continuously through the outlet 7 at the rate of 15 Nm.³ per hour. From the granular material inlet 8 disposed over the chlorine gas outlet 7, siliceous sand with a grain size of about 800μ and maintained at 25° C. is admitted at the rate of 25 kg. per hour.

The siliceous sand flows by gravity along the wall where said outlet 7 is located, whereby the gasified iron chloride is condensed and deposited on the siliceous sand, while the moving sand scrapes off any deposits of iron chloride from the wall.

The siliceous sand is then washed with water and dried before being recycled. In a test where the withdrawal of chlorine gas was continued for 2,000 hours, it was found that substantially no condensate of iron chloride, nor clogging, was encountered at the outlet.

In the above test, when the gravity-feeding of siliceous sand was suspended, the outlet was blocked by iron chloride condensate after 100 hours, so that the withdrawal of product gas was substantially prevented.

Example 2

Using chlorination and dechlorination chambers similar to those described in Example 1, a pipe 6 cm. in inside diameter and 100 cm. long is inserted into the core of the dechlorination chamber 3 so as to withdraw the product gas from the core section of the chamber.

The same reaction masses as those of Example 1 are chlorinated and oxidized to produce chlorine gas, which is continuously withdrawn from the dechlorination chamber through the above pipe and the gas outlet 7 at the rate of 15 Nm.³/hr.

Admitted from the inlet 8, located over the gas outlet 7, are the reaction masses (grain size 5,000μ) which have already passed through the oxidation step and been cooled to about 50° C., at the rate of 30 kg./hr. The reaction masses flow by gravity along the wall of said outlet, condensing and trapping the gasified iron chloride. Those reaction masses are recycled to the chlorination and oxidation process.

In a test where the withdrawal of product gas was continued for 1500 hours, it was found that substantially no condensation and deposition of iron chloride nor clogging of the outlet was encountered. In the same test, when the gravity-feeding of the reaction masses was suspended, the outlet was blocked by the iron chloride condensate after 100 hours, so that withdrawal of the chlorine gas proved substantially impossible.

What we claim as our invention is:

1. A method of preventing the clogging of a gas outlet in a process wherein a reaction mass comprising an iron oxide, potassium chloride and a copper chloride supported on diatomaceous earth is chlorinated with a chloride selected from the group consisting of hydrogen chloride and ammonium chloride to convert the iron oxide to iron chloride, the iron chloride-containing reaction mass is contacted with an oxygen-containing gas at a temperature of 400° C. to 650° C. in a confined space to liberate chlorine gas, and the resultant gaseous mixture containing chlorine gas and iron chloride is withdrawn from the confined space through said gas outlet, including the steps of contacting the gaseous mixture in the gas outlet with a granular material selected from the group consisting of siliceous sand and said reaction mass, the granular material having a temperature lower than the temperature of the gaseous mixture to effect quenching of the gaseous mixture and condensation of the iron chloride portion of the gaseous mixture on the granular material, and passing the granular material through the gas outlet in contact with the wall of the outlet to scrape off any deposit of condensed iron chloride from the gas outlet wall.

2. A method as claimed in claim 1, wherein the granular material ranges from 100μ to 8,000μ in grain size.

3. A method as claimed in claim 1, wherein the temperature of said granular material is less than 400° C.

4. A method as claimed in claim 1, wherein the gas outlet is provided at the periphery of said confined space where the temperature is lowest.

5. A method as claimed in claim 4, wherein the iron-chloride containing reaction mass is contacted with a counter-current flow of the oxygen-containing gas while flowing by gravity through the confined space, and said gas outlet extends from the periphery of the confined space downwardly and outwardly.

References Cited
UNITED STATES PATENTS

| | | | |
|---|---|---|---|
| 2,577,808 | 12/1951 | Pye et al. | 23—219 |
| 3,383,177 | 5/1968 | Metaizeau | 23—219 |
| 3,443,360 | 5/1969 | Reeves | 55—71 |

OSCAR R. VERTIZ, Primary Examiner

G. ALVARO, Assistant Examiner

U.S. Cl. X.R.

23—87; 55—71